(12) United States Patent  
Misawa

(10) Patent No.: US 8,369,615 B2  
(45) Date of Patent: Feb. 5, 2013

(54) IMAGE PROCESSING APPARATUS AND METHOD FOR EFFICIENTLY REDUCING THE AMOUNT OF IMAGE DATA

(75) Inventor: Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/827,782

(22) Filed: Jun. 30, 2010

(65) Prior Publication Data

US 2011/0002534 A1  Jan. 6, 2011

(30) Foreign Application Priority Data

Jul. 2, 2009 (JP) ................................. 2009-157916

(51) Int. Cl.
*G06K 9/00* (2006.01)
*G06K 9/34* (2006.01)
(52) U.S. Cl. ..................................................... 382/162
(58) Field of Classification Search .................. 382/162, 382/164, 165, 168, 298–300; 358/2.1, 515
See application file for complete search history.

(56) References Cited

U.S. PATENT DOCUMENTS

| 5,768,403 | A | * | 6/1998 | Suzuki et al. | 358/2.1 |
| 6,411,730 | B1 | * | 6/2002 | Bartell et al. | 382/168 |
| 6,711,287 | B1 | * | 3/2004 | Iwasaki | 382/165 |
| 2011/0002534 | A1 | * | 1/2011 | Misawa | 382/162 |
| 2011/0091099 | A1 | * | 4/2011 | Akiyama | 382/162 |
| 2011/0176727 | A1 | * | 7/2011 | Kataoka | 382/164 |

FOREIGN PATENT DOCUMENTS

JP  9-220830 A  8/1997

* cited by examiner

*Primary Examiner* — Amir Alavi
(74) *Attorney, Agent, or Firm* — Carter, DeLuca, Farrell & Schmidt LLP

(57) ABSTRACT

An apparatus includes: a division unit configured to divide image data into a plurality of blocks each being composed of a plurality of pixels; a detection unit configured to detect a most frequent color for each of the blocks; a calculation unit configured to calculate an occupancy rate of the most frequent color for each of the blocks; and a generation unit configured to generate data by changing between a block composed of at least a low-resolution pixel and a block composed of low- and high-resolution pixels superimposed with each other, based on the most frequent color occupancy rate.

18 Claims, 13 Drawing Sheets

FIG.1A
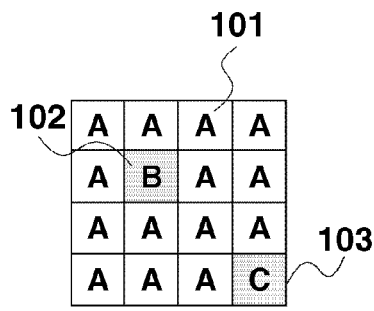
FIG.1B
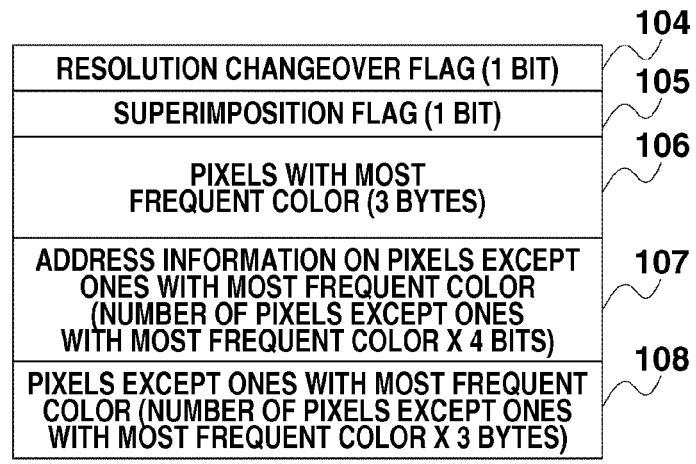
FIG.1C
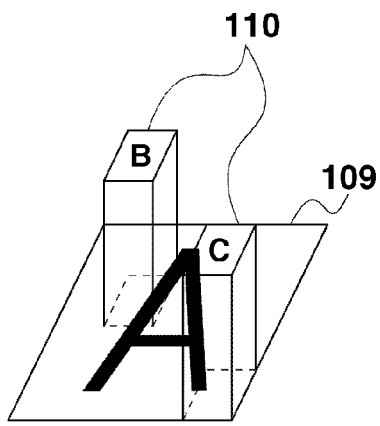
FIG.1D
| (0,0) | (1,0) | (2,0) | (3,0) |
|---|---|---|---|
| (0,1) | (1,1) | (2,1) | (3,1) |
| (0,2) | (1,2) | (2,2) | (3,2) |
| (0,3) | (1,3) | (2,3) | (3,3) |

FIG.5A

| A | A | A | A |
|---|---|---|---|
| A | A | A | A |
| A | A | A | A |
| A | A | A | A |

| A | A | A | A |
|---|---|---|---|
| A | A | B | A |
| A | A | A | A |
| A | A | A | A |

| A | A | A | A |
|---|---|---|---|
| A | B | A | A |
| A | A | A | A |
| A | A | A | C |

| A | A | A | A |
|---|---|---|---|
| B | A | B | A |
| A | A | A | A |
| A | A | C | A |

| A | C | A | A |
|---|---|---|---|
| A | A | A | B |
| B | A | A | C |
| A | A | A | A |

| A | A | A | A |
|---|---|---|---|
| A | A | A | B |
| B | A | A | C |
| A | A | D | B |

| A | C | A | A |
|---|---|---|---|
| A | A | D | B |
| B | A | A | A |
| A | D | A | B |

| B | C | A | A |
|---|---|---|---|
| A | A | A | B |
| B | A | A | C |
| A | D | A | B |

| B | C | A | B |
|---|---|---|---|
| A | A | A | B |
| B | A | A | C |
| A | D | A | B |

| B | C | A | B |
|---|---|---|---|
| A | A | C | B |
| B | A | A | C |
| A | D | A | B |

| B | C | A | B |
|---|---|---|---|
| A | A | C | B |
| B | A | E | C |
| A | D | A | B |

| B | C | A | B |
|---|---|---|---|
| A | A | C | D |
| B | E | E | C |
| A | D | A | B |

| B | C | E | D |
|---|---|---|---|
| A | A | C | B |
| B | E | E | C |
| A | D | A | D |

| B | C | E | D |
|---|---|---|---|
| A | A | C | B |
| F | E | G | B |
| A | D | G | F |

| A | B | C | D |
|---|---|---|---|
| E | F | G | H |
| I | J | A | L |
| M | N | O | P |

| A | B | C | D |
|---|---|---|---|
| E | F | G | H |
| I | J | K | L |
| M | N | O | P |

0%

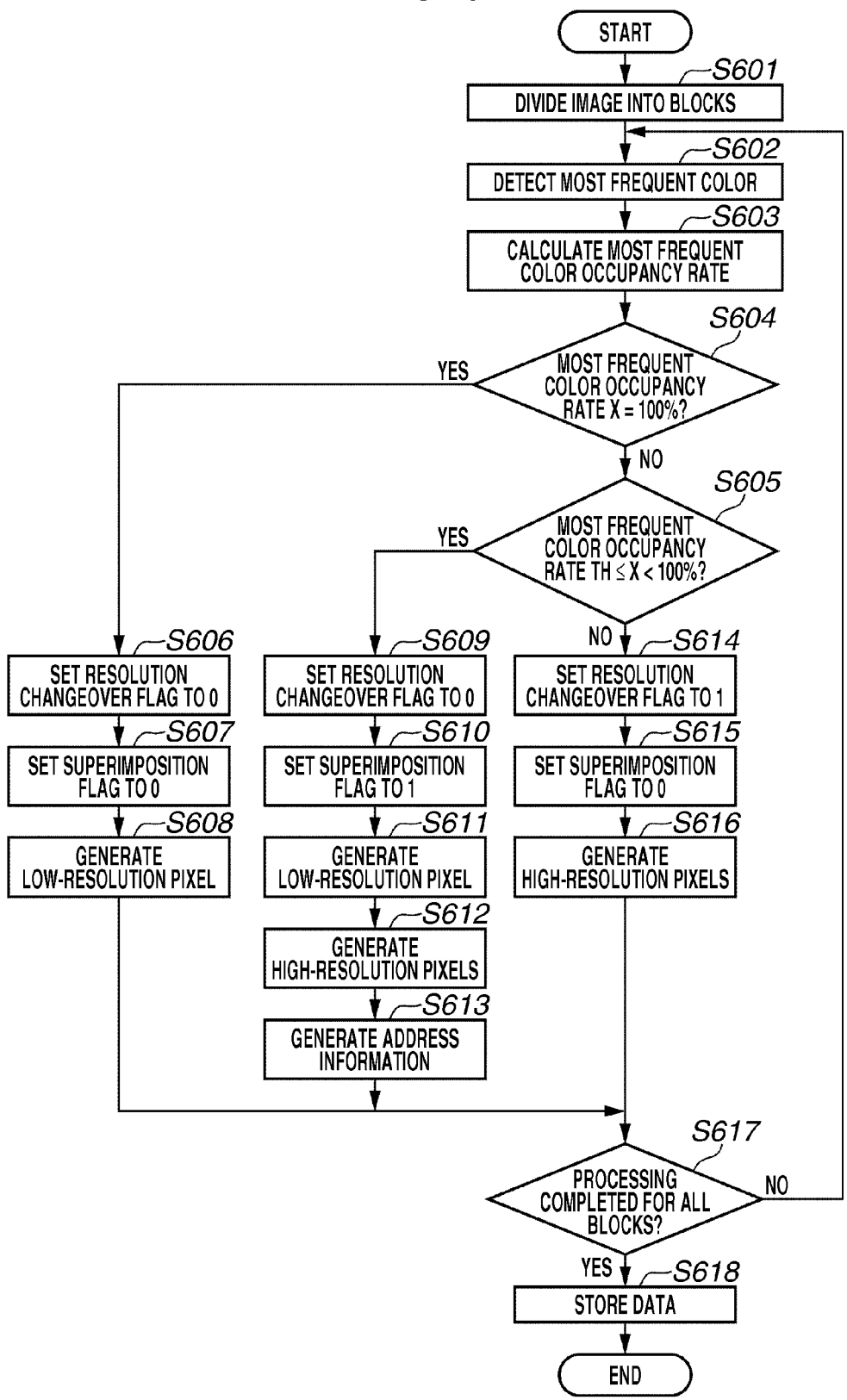

FIG.7

| | 701 | 702 | 703 | 704 |
|---|---|---|---|---|
| RESOLUTION CHANGEOVER FLAG (1 BIT) | 0 | 0 | 0 | 1 |
| SUPERIMPOSITION FLAG (1 BIT) | 0 | 1 | 1 | 0 |
| PIXELS WITH MOST FREQUENT COLOR (3 BYTES) | A | A | A | NONE |
| ADDRESS INFORMATION ON PIXELS EXCEPT ONES WITH MOST FREQUENT COLOR (NUMBER OF PIXELS EXCEPT ONES WITH MOST FREQUENT COLOR × 4 BITS) | NONE | (1,1) (3,) | (1,1) (0,2)(3,2) (2,3)(3,3) | NONE |
| PIXELS EXCEPT ONES WITH MOST FREQUENT COLOR (NUMBER OF PIXELS EXCEPT ONES WITH MOST FREQUENT COLOR × 3 BYTES) | NONE | B C | B C D B | NONE |

FIG.8

| MOST FREQUENT COLOR OCCUPANCY RATE (%) | NUMBER OF PIXELS CONSTITUTING BLOCK | | AMOUNT OF DATA (BITS) | | | | TOTAL NUMBER OF BITS |
|---|---|---|---|---|---|---|---|
| | NUMBER OF PIXELS WITH MOST FREQUENT COLOR | NUMBER OF PIXELS EXCEPT ONES WITH MOST FREQUENT COLOR | COLOR INFORMATION AMOUNT (TOTAL NUMBER OF PIXELS × 24 BITS) | RESOLUTION CHANGEOVER FLAG (1 BIT) | SUPERIMPOSITION FLAG (1 BIT) | ADDRESS INFORMATION ON PIXELS EXCEPT ONES WITH MOST FREQUENT COLOR (NUMBER OF PIXELS EXCEPT ONES WITH MOST FREQUENT COLOR × 4 BITS) | |
| 0 | 0 | 16 | 384 | 1 | 1 | 0 | 386 |
| 12.5 | 1 | 14 | 360 | 1 | 1 | 56 | 418 |
| 18.75 | 1 | 13 | 336 | 1 | 1 | 52 | 390 |
| 25 | 1 | 12 | 312 | 1 | 1 | 48 | 362 |
| 31.25 | 1 | 11 | 288 | 1 | 1 | 44 | 334 |
| 37.5 | 1 | 10 | 264 | 1 | 1 | 40 | 306 |
| 43.75 | 1 | 9 | 240 | 1 | 1 | 36 | 278 |
| 50 | 1 | 8 | 216 | 1 | 1 | 32 | 250 |
| 56.25 | 1 | 7 | 192 | 1 | 1 | 28 | 222 |
| 62.5 | 1 | 6 | 168 | 1 | 1 | 24 | 194 |
| 68.75 | 1 | 5 | 144 | 1 | 1 | 20 | 166 |
| 75 | 1 | 4 | 120 | 1 | 1 | 16 | 138 |
| 81.25 | 1 | 3 | 96 | 1 | 1 | 12 | 110 |
| 87.5 | 1 | 2 | 72 | 1 | 1 | 8 | 82 |
| 93.75 | 1 | 1 | 48 | 1 | 1 | 4 | 54 |
| 100 | 1 | 0 | 24 | 1 | 1 | 1 | 26 |

FIG.12
1201
1202
1203
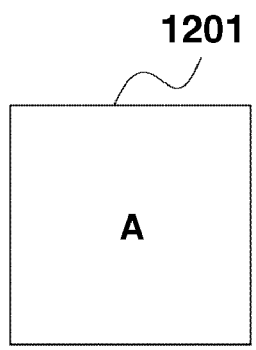
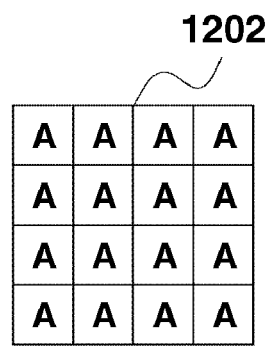
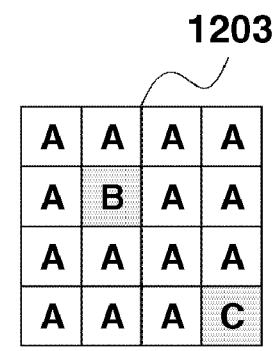

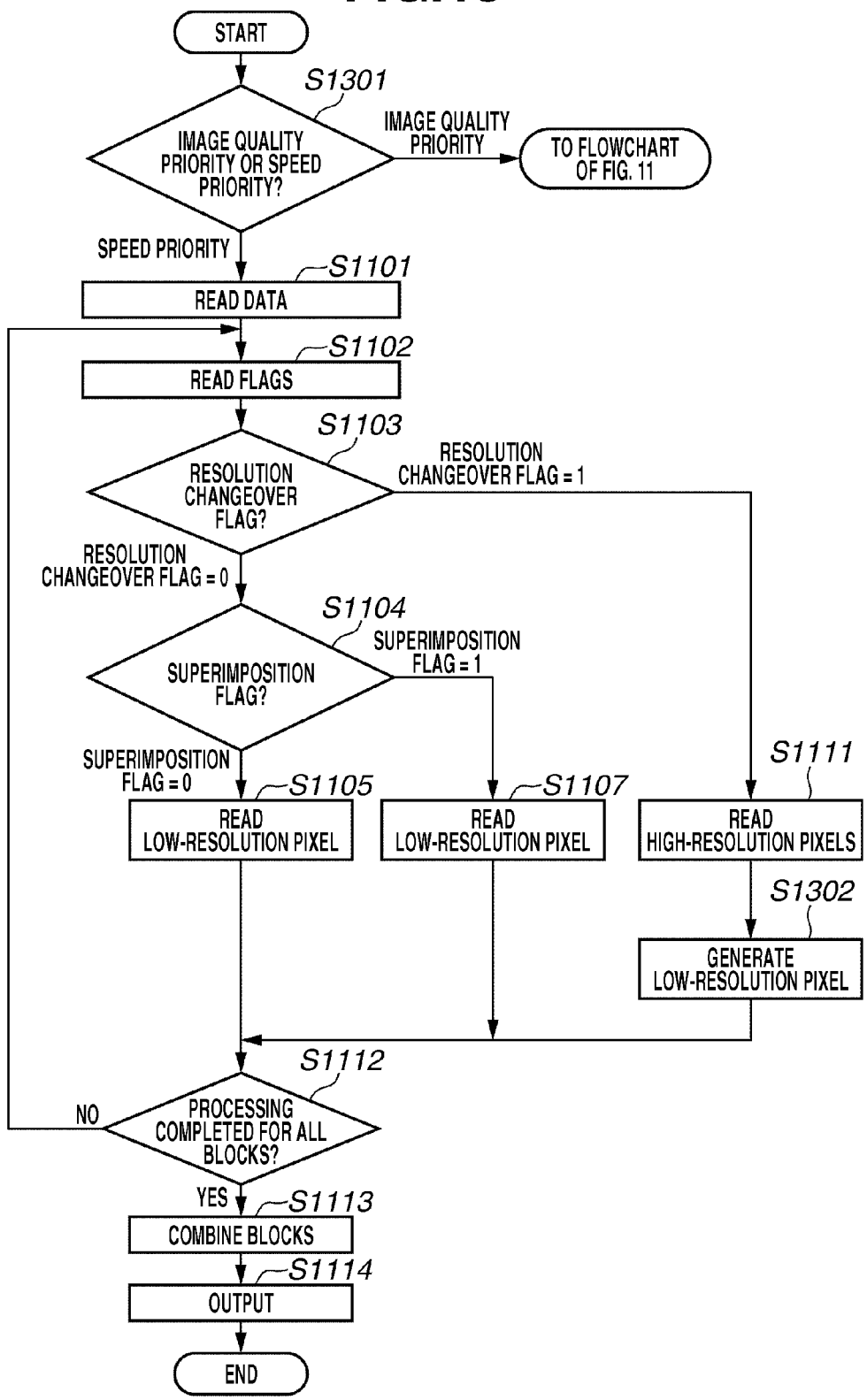

IMAGE PROCESSING APPARATUS AND METHOD FOR EFFICIENTLY REDUCING THE AMOUNT OF IMAGE DATA

BACKGROUND OF THE INVENTION

1. Field of the Invention

The present invention relates to an image processing apparatus which efficiently reduces the amount of data, an image processing method, and a computer program.

2. Description of the Related Art

Conventionally, printing an image while changing the resolution for each pixel according to the characteristics of the image can prevent the generation of excessive data while maintaining the image quality, thus preventing deterioration in image quality and an increase in the amount of print data more than necessary.

Japanese Patent Application Laid-Open No. 9-220830 divides an image into a plurality of blocks having a predetermined size and determines whether each of the blocks has a uniform color. When a block has a uniform color, it is recognized as a low-resolution pixel. In this case, the block composed of several dots is practically used as one pixel. Otherwise, when the block does not have a uniform color, the block is recognized as a high-resolution pixel. In this case, print data having a plurality of resolutions is generated. A resolution changeover code is used to change between the low-resolution pixel and the high-resolution pixels.

In the above-mentioned method, since an image is divided into a plurality of blocks having a predetermined size and it is determined whether these blocks have a uniform color, the amount of data may not easily be reduced depending on the characteristics of the image even when many pixels of an identical value continue. For example, since an edge of text and graphics, a copy-forgery-inhibited pattern, and a lattice pattern do not have a uniform color, they are recognized as high-resolution pixels and therefore the amount of data cannot easily be reduced. FIG. 9 illustrates an exemplary lattice pattern image 901. When the image 901 is divided into six 4×4 blocks, blocks 902 to 907 are formed. Since the blocks 902 and 903 have a uniform color, they can be recognized as a low-resolution pixel as illustrated by an image 908. Since the blocks 904 to 907 do not have a uniform color, they are recognized as high-resolution pixels and therefore the amount of data cannot easily be reduced.

Further, when an exemplary image 909 representing an edge portion of graphics is divided into four 4×4 blocks, blocks 910 to 913 are formed. Since the blocks 910 to 913 do not have a uniform color, they are recognized as high-resolution pixels and therefore the amount of data cannot easily be reduced.

SUMMARY OF THE INVENTION

According to an aspect of the present invention, an apparatus includes: a division unit configured to divide image data into a plurality of blocks each being composed of a plurality of pixels; a detection unit configured to detect a most frequent color in each of the blocks; a calculation unit configured to calculate an occupancy rate of the most frequent color; and a generation unit configured to generate data by changing between a block composed of a low-resolution pixel and a block composed of low- and high-resolution pixels superimposed with each other, based on the most frequent color occupancy rate.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A, 1B, 1C, and 1D illustrate a data structure according to the present invention.

FIGS. 5A to 5P illustrate a most frequent color occupancy rate according to the present invention.

FIG. 6 is a flow chart illustrating an overview of processing performed by the image processing system according to the present invention.

FIG. 7 illustrates data structures according to the present invention.

FIG. 8 illustrates a relation between the most frequent color occupancy rate and the amount of data according to the present invention.

FIG. 12 illustrates data restoration according to the third exemplary embodiment of the present invention.

FIG. 13 is a flow chart illustrating processing in the resolution changeover unit 218 in FIG. 2 according to a fourth exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention will be described below with reference to the accompanying drawings.

Figure 2:
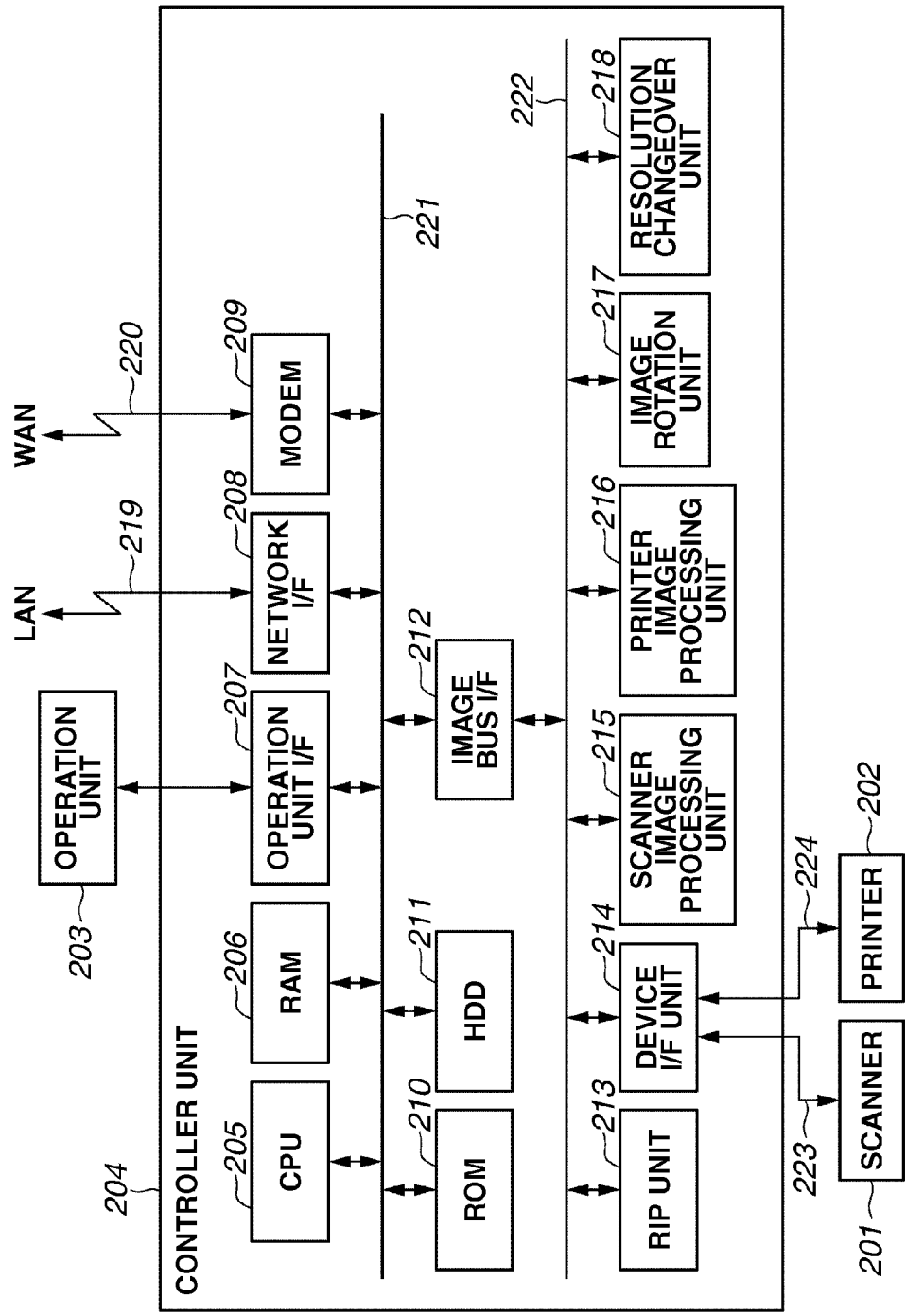
FIG. 2 is a block diagram illustrating an image processing system according to the present invention.

FIG. 2 is a block diagram illustrating the configuration of a multi function peripheral (MFP) which is an image processing apparatus according to the present exemplary embodiment.

The MFP includes a scanner unit 201 as an image input device, a printer unit 202 as an image output device, a control unit 204 composed of a central processing unit (CPU) 205, and an operation unit 203 as a user interface. The control unit 204 connects with the scanner unit 201, the printer unit 202, and the operation unit 203. The control unit 204 also serves as a controller to input and output image information or device information via a local area network (LAN) 219 and a public line (wide area network (WAN)) 220, i.e., a common telephone line network. The CPU 205 controls each unit included in the control unit 204. A random access memory (RAM) 206 serves not only as a system work memory necessary for the operation of the CPU 205 but also as an image memory for temporarily storing image data. A read-only memory (ROM) 210 serves as a boot ROM to store various programs such as a boot program of the system. A storage unit 211 is a hard disk drive which stores system control software and image data. An operation unit interface (I/F) 207 serves as an interface with the operation unit (user interface (UI)) 203 to output to the operation unit 203 image data to be displayed thereon. The operation unit I/F 207 also conveys to the CPU 205 information input by a user of the image processing apparatus via the operation unit 203. A network interface (IF) 208 connects the image processing apparatus to the LAN 219 to input and output packet-formed information. A modem 209 connects the image processing apparatus to a public line 220 to input and output information through demodulation and modulation processes. The above-mentioned devices are arranged on a system bus 221.

An image bus interface 212 serves as a bus bridge to connect the system bus 221 and an image bus 222 for high-speed image data transmission in order to convert the data structure. The image bus 222 is composed of the PCI bus and IEEE1394. The following devices are arranged on the image bus 222. A raster image processor (RIP) unit 213 analyzes a page description language (PDL) code and rasterizes a bitmap image with a specified resolution to implement so-called rendering processing. A device interface (I/F) unit 214 connects to the control unit 204 the scanner unit 201 as an image input device via a signal line 223 and the printer unit 202 as an image output device via a signal line 224. The device I/F unit 214 performs image data conversion between synchronous and asynchronous systems. A scanner image processing unit 215 corrects, processes, and edits input image data. A printer image processing unit 216 corrects print image data and converts its resolution according to the printer unit 202 to which the image data is to be output. An image rotation unit 217 rotates input image data to obtain an erect image. A resolution changeover unit 218 will be described below.

Figure 4:
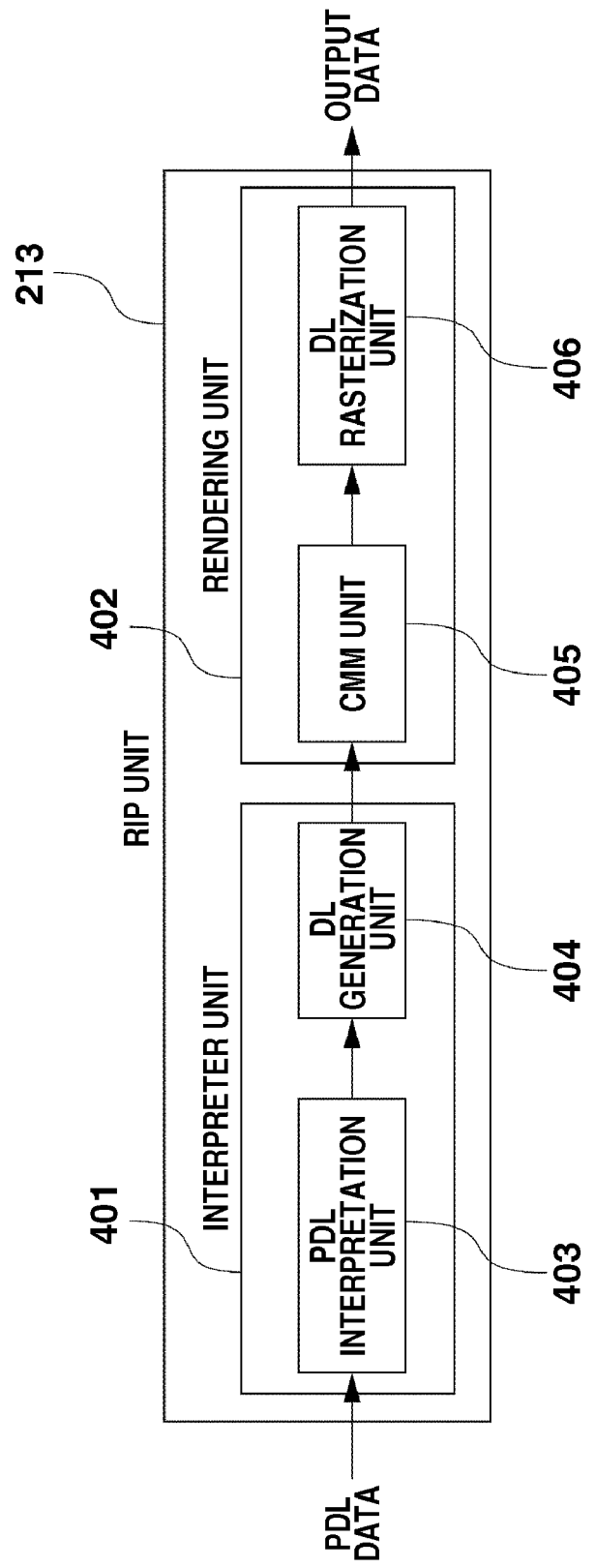
FIG. 4 is a block diagram illustrating an exemplary configuration of a raster image processor (RIP) unit in FIG. 2.
Figure 9:
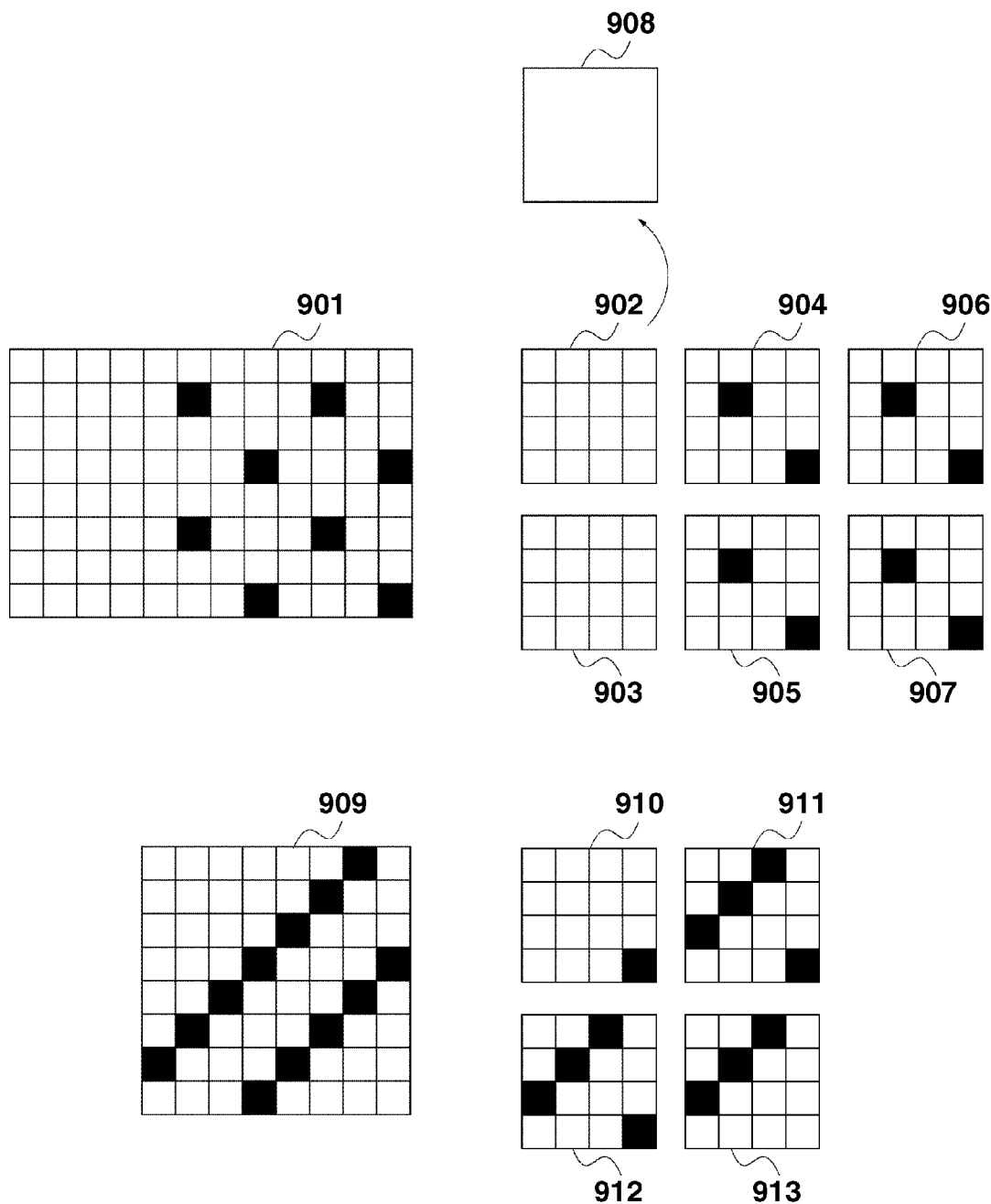
FIG. 9 is a diagram for supplementing a subject of the present invention.

The RIP unit 213 will be described in detail below with reference to FIG. 4. The RIP unit 213 generally includes two unit: an interpreter unit 401 and a rendering unit 402. The interpreter unit 401 includes a page description language (PDL) interpretation unit 403 and a display list (DL) generation unit 404. The rendering unit 402 includes a color matching module (CMM) unit 405 and a DL rasterization unit 406. At the time of printing, the RIP unit 213 inputs PDL data based on the page description language (PDL). The PDL data is described using rendering commands for drawing text, graphics, and image objects.

The PDL interpretation unit 403 interprets the rendering commands. The DL generation unit 404 converts the PDL data interpreted by the PDL interpretation unit 403 into intermediate data called a display list. During conversion into the intermediate data, rendering commands different between PostScript (PS) (registered trademark), Print Control Language (PCL), LBP Image Processing System (LIPS) (registered trademark), and Portable Document Format (PDF) are converted into common rendering commands. The CMM unit 405 performs color matching for the intermediate data. The DL rasterization unit 406 rasterizes the intermediate data that completed color matching, to bitmap image data.

Then, the DL rasterization unit 406 transmits the rasterized bitmap image data to the resolution changeover unit 218.

[Resolution Changeover Unit]

The resolution changeover unit 218 will be described in detail below with reference to FIG. 3. The resolution changeover unit 218 includes a block division unit 301, a most frequent color detection unit 302, a most frequent color occupancy rate calculation unit 303, a resolution changeover flag setting unit 304, a superimposition flag setting unit 305, and a data generation unit 306. The resolution changeover unit 218 inputs the bitmap image data output from the RIP unit 213. The block division unit 301 divides input data 300 into a plurality of blocks each being composed of M×N pixels (M and N are integers). In the present exemplary embodiment (a first exemplary embodiment), the input data 300 are divided into a plurality of 4×4 blocks. The most frequent color detection unit 302 detects a color used most frequently (hereinafter referred to as most frequent color) in each of the blocks formed by the block division unit 301, for example, by generating a color distribution of each pixel in each block and determining a peak value as the most frequent color.

The most frequent color occupancy rate calculation unit 303 calculates an occupancy rate of the most frequent color as a most frequent color occupancy rate in each block. The resolution changeover flag setting unit 304 sets the resolution changeover flag according to whether or not each block is recognized as a low-resolution pixel. When there is a pixel recognized as a low-resolution pixel, the data structure is based on a low-resolution pixel and therefore the resolution changeover flag is set to 0. Otherwise, when there is no pixel recognized as a low-resolution pixel, the data structure is based on high-resolution pixels and therefore the resolution changeover flag is set to 1. The superimposition flag setting unit 305 sets the superimposition flag according to whether or not there is at least one pixel to be superimposed in each block. Superimposition refers to a method of image representation with which the pixels having the most frequent color recognized as a low-resolution pixel are superimposed with the remaining pixels (pixels except ones having the most frequent color) recognized as high-resolution pixels.

The data generation unit 306 generates data based on a data structure mentioned below and transmits the generated data to the RAM 206, a hard disk drive (HDD) 211, and the printer image processing unit 216 as output data.

[Most Frequent Color Occupancy Rate]

The most frequent color occupancy rate calculated by the most frequent color occupancy rate calculation unit 303 will be described below with reference to FIGS. 5A to 5P. FIGS. 5A to 5P illustrate 16 blocks each being composed of 4×4 (16) pixels, with the occupancy rate gradually changed from 100% to 0%.

Each of the pixels illustrated in FIGS. 5A to 5P has a color represented by 3 bytes or 24 bits (8 bits for each of R, G, and B). Each pixel has a different color ($A \neq B \neq C \neq \ldots \neq P$). Each of the pixels illustrated in FIGS. 5A to 5O has a most frequent color A, and the pixel illustrated in FIG. 5P does not have a most frequent color.

For example, referring to FIG. 5I, the 16 pixels include eight pixels having color A, five pixels having color B, two pixels having color C, and one pixel having color D. The most frequent color is color A. The occupancy rate is obtained by dividing the number of pixels having the most frequent color by the total number of pixels. Referring to FIG. 5I, the occupancy rate is $8/16 = 50\%$.

When there is a plurality of most frequent colors, either color can be the most frequent color. For example, referring to FIG. 5N, the 16 pixels include three pixels having color A, three pixels having color B, two pixels having color C, two pixels having color D, two pixels having color E, two pixels having color F, and two pixels having color G. Either color A or B can be the most frequent color. Referring to FIG. 5P, the 16 pixels include one pixel having colors A to P and therefore there is no most frequent color.

A data structure for superimposing low- and high-resolution pixels in the first exemplary embodiment of the present invention will be described below with reference to FIGS. 1A to 1D.

FIG. 1A illustrates a block of FIG. 5C. In the present exemplary embodiment, data management is based on a data structure composed of low- and high-resolution pixels superimposed with each other. Referring to FIG. 1A, pixels 101 with color A (the most frequent color) are recognized as a low-resolution pixel, and the remaining pixels (pixels except ones having the most frequent color), i.e., a pixel 102 with color B and a pixel 103 with color C are recognized as high-resolution pixels. For example, when the input data is bitmap image data having a resolution of 1200 dpi, using a block composed of 4×4 pixels practically as one pixel results in a low-resolution pixel having a resolution of 300 dpi, and using each of the 4×4 pixels as one pixel results in a high-resolution pixel having a resolution of 1200 dpi.

The data structure will be described below with reference to data items 104 to 108 in FIG. 1B. The data item 104 denotes a resolution changeover flag composed of one bit. The resolution changeover flag is set according to whether or not each block is recognized as a low-resolution pixel. When there is a pixel recognized as a low-resolution pixel, the data structure is based on a low-resolution pixel and therefore the resolution changeover flag is set to 0. Otherwise, when there is no pixel recognized as a low-resolution pixel, the data structure is based on high-resolution pixels and therefore the resolution changeover flag is set to 1. Since the pixels 101 are recognized as a low-resolution pixel, the data structure is based on a low-resolution pixel and therefore the resolution changeover flag is set to 0.

The data item 105 denotes a superimposition flag composed of one bit. The superimposition flag is set according to whether or not there is at least one pixel to be superimposed in each block. Superimposition refers to a method of image representation with which the pixels having the most frequent color recognized as a low-resolution pixel are superimposed with the remaining pixels (pixels except ones having the most frequent color) recognized as high-resolution pixels. The above description will be supplemented with reference to FIG. 1C.

FIG. 1C illustrates a result of superimposition of low- and high-resolution pixels. A pixel 109 is recognized as a low-resolution pixel, and the pixels 110 are recognized as high-resolution pixels. The amount of data can be reduced based on the data structure composed of low- and high-resolution pixels superimposed with each other. Specifically, as mentioned above, the pixels 101 with color A (the most frequent color) are recognized as a low-resolution pixel, and the remaining pixels (pixels except ones having the most frequent color), i.e., the pixel 102 with color B and the pixel 103 with color C are recognized as high-resolution pixels. When there is at least one pixel to be superimposed, the superimposition flag is set to 1. Otherwise, when there is no pixel to be superimposed, the superimposition flag is set to 0. When there is no pixel recognized as a low-resolution pixel, a block is composed only of high-resolution pixels and therefore it is determined that there is no pixel to be automatically superimposed.

The data item 106 denotes information about pixels having the most frequent color. The data item 106 includes 3-byte information since there is always one most frequent color in each block. The data item 107 denotes address information on pixels except ones having the most frequent color. This information is used to determine positions at which pixels except ones having the most frequent color are arranged. For example, when a block is composed of 4×4 pixels, each pixel except ones having the most frequent color is represented by an information amount of 4 bits: (0,0) to (3,3) as illustrated in FIG. 1D. Referring to FIG. 1A, the address information on the pixel 103 with color C is represented by (1,1), and the address information on the pixel 102 with color B is represented by (3,3). The data item 108 denotes color information on pixels except ones having the most frequent color. The data item 108 includes information having the number of pixels except ones having the most frequent color times 3 (bytes).

Referring to FIG. 7, blocks 701 to 704 illustrate the above-mentioned data structure of blocks of FIGS. 5A, 5C, 5F, and 5P, respectively.

First of all, the block 701 has a most frequent color occupancy rate of 100% and therefore is composed only of a pixel recognized as a low-resolution pixel. Further, since the data structure is based on a low-resolution pixel, the resolution changeover flag is set to 0. Further, since there is no pixel to be superimposed, the superimposition flag is set to 0. "PIXELS WITH MOST FREQUENT COLOR" is "A." Since the block 701 is composed only of pixels having the most frequent color, "ADDRESS INFORMATION ON PIXELS EXCEPT ONES WITH MOST FREQUENT COLOR" and "PIXELS EXCEPT ONES WITH MOST FREQUENT COLOR" are all "NONE."

Then, the block 702 has a most frequent color occupancy rate of 87.5% and therefore includes pixels recognized as a low-resolution pixel and pixels recognized as high-resolution pixels. Further, since the data structure is based on a low-resolution pixel, the resolution changeover flag is set to 0. Further, since there is at least one pixel to be superimposed, the superimposition flag is set to 1. "PIXELS WITH MOST FREQUENT COLOR" is "A." "ADDRESS INFORMATION ON PIXELS EXCEPT ONES WITH MOST FREQUENT COLOR" is "(1,1) (3,3)", and "PIXELS EXCEPT ONES WITH MOST FREQUENT COLOR" is "BC."

Then, the block 703 has a most frequent color occupancy rate of 68.75% and therefore includes pixels recognized as a low-resolution pixel and pixels recognized as high-resolution pixels. Further, since the data structure is based on a low-resolution pixel, the resolution changeover flag is set to 0. Further, since there is at least one pixel to be superimposed, the superimposition flag is set to 1. "PIXELS WITH MOST FREQUENT COLOR" is "A." "ADDRESS INFORMATION ON PIXELS EXCEPT ONES WITH MOST FREQUENT COLOR" is "(3,1) (0,2) (3,2) (2,3) (3,3)", and "PIXELS EXCEPT ONES WITH MOST FREQUENT COLOR" is "BCD."

Then, the block 704 has a most frequent color occupancy rate of 0% and therefore is composed only of pixels recognized as high-resolution pixels. Further, since the data structure is based on high-resolution pixels, the resolution changeover flag is set to 1. Since the block 704 has no most frequent color, "PIXELS WITH MOST FREQUENT COLOR", "ADDRESS INFORMATION ON PIXELS EXCEPT ONES WITH MOST FREQUENT COLOR", and "PIXELS EXCEPT ONES WITH MOST FREQUENT COLOR" are all "NONE."

A relation between the most frequent color occupancy rate and the amount of data will be described below. FIG. 8 illustrates the number of pixels constituting a block and the amount of data (number of bits) of each 4×4 block with the most frequent color occupancy rate changed from 0% to 100%.

The number of pixels constituting a block includes the number of pixels having the most frequent color and the number of pixels except ones having the most frequent color. As mentioned above, when the most frequent color occupancy rate is 0%, the number of pixels having the most frequent color is 0, and the number of pixels except ones having the most frequent color is 16. Further, when the most frequent color occupancy rate is 75%, the number of pixels having the most frequent color is 1, and the number of pixels except ones having the most frequent color is 4. Further, when the most frequent color occupancy rate is 100%, the number of pixels having the most frequent color is 1, and the number of pixels except ones having the most frequent color is 0.

Then, the amount of data is represented by the total of the color information amount (total number of pixels×24 (bits)), the resolution changeover flag (1 bit), the superimposition flag (1 bit), and the address information on pixels except ones having the most frequent color (number of pixels except ones having the most frequent color times 4 (bits)). When the most frequent color occupancy rate is 0%, since the total number of pixels including the number of pixels having the most frequent color and the number of pixels except ones having the most frequent color is 16, the color information amount is calculated to be 384 (=16×24) bits. When the resolution changeover flag (1 bit) and the superimposition flag (1 bit) are added to the color information amount, the total amount of data becomes 386 bits. Further, when the most frequent color occupancy rate is 50%, since the total number of pixels including the number of pixels having the most frequent color and the number of pixels except ones having the most frequent color is 9, the color information amount is calculated to be 216 (=9×24) bits. When the resolution changeover flag (1 bit), the superimposition flag (1 bit), and the address information on pixels except ones having the most frequent color (32 (=8×4) bits) are added to the color information amount, the total amount of data becomes 250 bits.

In consideration that the amount of data is 384 (=16×24) bits in the case of 4×4 or 16 pixels, an effect of reducing the amount of data is observed in ranges 802 and 803. The known technique uses a block composed of 4×4 pixels practically as one pixel illustrated as the range 803, which enables reduction of the amount of data. Therefore, the present exemplary embodiment has an effect of reducing the amount of data in the range 802.

Next, an overview of overall processing performed by the image processing system according to the first exemplary embodiment will be described below with reference to the flow chart of FIG. 6. The flow chart illustrated in FIG. 6 is assumed to be performed by the resolution changeover unit 218 of FIG. 2 (each processing unit of FIG. 3). Although the CPU 205 reads and executes a computer program stored in the storage unit 211 (computer-readable storage medium) to serve as the resolution changeover unit 218 (each processing unit of FIG. 3) in the present exemplary embodiment, the configuration of the resolution changeover unit 218 is not limited thereto. For example, the resolution changeover unit 218 (each processing unit of FIG. 3) may be configured by hardware such as an electronic circuit.

FIG. 6 is a flow chart for performing data generation processing for reducing the amount of data without degrading the image quality of the bitmap image data output from the RIP unit 213.

In step S601, the block division unit 301 divides the bitmap image data output from the RIP unit 213 into a plurality of blocks each being composed of M×N pixels (M and N are integers). Processing of subsequent steps S602 to S616 is performed for each block.

In step S602, the most frequent color detection unit 302 detects a color used most frequently (hereinafter referred to as a most frequent color) in each of the blocks formed by the block division unit 301.

In step S603, the most frequent color occupancy rate calculation unit 303 calculates an occupancy rate of the most frequent color (detected in step S602) as a most frequent color occupancy rate in each block. The most frequent color occupancy rate is assumed to be X (%).

In step S604, the CPU 205 determines whether or not the most frequent color occupancy rate X calculated in step S603 is 100%. When the CPU 205 determines that the most frequent color occupancy rate X is 100% (YES in step S604), the processing proceeds to step S606. When the CPU 205 determines that the most frequent color occupancy rate X is 100% (YES in step S604), the CPU 205 recognizes the pixels having the most frequent color as a low-resolution pixel and determines that the target block is to be suitably composed only of a low-resolution pixel, as mentioned above.

In step S606, the resolution changeover flag setting unit 304 sets the resolution changeover flag to 0, and stores it in the RAM 206 so that the positional information is associated with the resolution changeover flag setting of 0 for the target block. In step S607, the superimposition flag setting unit 305 sets the superimposition flag to 0 since there is no pixel to be superimposed, and stores it in the RAM 206 so that the positional information is associated with the superimposition flag setting of 0 for the target block. In step S608, the data generation unit 306 generates a low-resolution pixel by using the pixels having the most frequent color. When a low-resolution pixel is generated, the M×N pixels of the input data are converted into one pixel by using the pixels having the most frequent color.

The data generation unit 306 stores in the RAM 206 the data generated in step S608 so that it is associated with the positional information for the target block.

Returning to the description of step S604, in step S604, when the CPU 205 determines that the most frequent color occupancy rate X is not 100% (NO in step S604), the processing proceeds to step S605.

In step S605, the CPU 205 determines whether the most frequent color occupancy rate X calculated in step S603 is equal to or greater than a predetermined threshold value Th. When the block is composed of 4×4 pixels, as mentioned above with reference to FIG. 8, an effect of reducing the amount of data is observed only in a range where the most frequent color occupancy rate is 25% or more. In this case, therefore, the threshold value Th is set to 25.

When the CPU 205 determines that the most frequent color occupancy rate X is Th or more (YES in step S605), the processing proceeds to step S609. When the CPU 205 determines that the most frequent color occupancy rate X is Th or more (YES in step S605), the CPU 205 recognizes the pixels having the most frequent color as a low-resolution pixel, recognizes the remaining pixels (pixels except ones having the most frequent color) as high-resolution pixels, and determines that the target block is suitably represented by superimposing the low- and high-resolution pixels as mentioned above.

In step S609, the resolution changeover flag setting unit 304 sets the resolution changeover flag to 0, and stores it in the RAM 206 so that the positional information is associated with the resolution changeover flag setting of 0 for the target block.

In step S610, the superimposition flag setting unit 305 sets the superimposition flag to 1 since there is at least one pixel to be superimposed, and stores it in the RAM 206 so that the positional information is associated with the superimposition flag setting of 1 for the target block.

In step S611, the data generation unit 306 generates a low-resolution pixel by using the pixels having the most frequent color. When a low-resolution pixel is generated, the M×N pixels of the input data are converted into one pixel by using the pixels having the most frequent color.

In step S612, the data generation unit 306 generates high-resolution pixels by using the remaining pixels (pixels except ones having the most frequent color). When high-resolution pixels are generated, the remaining pixels (pixels except ones having the most frequent color) are used as they are among the M×N pixels of the input data.

In step S613, the data generation unit 306 generates address information on pixels except ones having the most frequent color.

The data generation unit 306 stores in the RAM 206 the data generated in steps S611 to S613 so that it is associated with the positional information for the target block.

Returning to the description of step S605, in step S605, when the CPU 205 determines that the most frequent color occupancy rate X is less than Th (NO in step S605), the processing proceeds to step S614. When the CPU 205 determines that the most frequent color occupancy rate X is less than Th (NO in step S605), the CPU 205 determines that the target block is to be suitably composed only of high-resolution pixels, as mentioned above.

In step S614, the resolution changeover flag setting unit 304 sets the resolution changeover flag to 1, and stores it in the RAM 206 so that the positional information is associated with the resolution changeover flag setting of 1 for the target block.

In step S615, the superimposition flag setting unit 305 sets the superimposition flag to 0 since there is no pixel to be superimposed, and stores it in the RAM 206 so that the positional information is associated with the superimposition flag setting of 0 for the target block.

In step S616, the data generation unit 306 generates high-resolution pixels by using the pixels having the most frequent color and the remaining pixels (pixels except ones having the most frequent color). When high-resolution pixels are generated, all the M×N pixels of the input data are used as they are.

The data generation unit 306 stores in the RAM 206 the data generated in step S616 so that it is associated with the positional information.

In step S617, the CPU 205 determines whether or not processing is completed for all blocks. When processing is not completed for all blocks (NO in step S617), the CPU 205 returns to step S602. When processing is completed for all blocks (YES in step S617), the processing proceeds to step S618.

In step S618, the CPU 205 associates data items stored in the RAM 206 for each block with one another, and stores them in the HDD 211.

When image data with high-resolution pixels is compressed through the JPEG process, the high-resolution image quality will degrade. Therefore, it is also possible to collect blocks composed only of a low-resolution pixel and apply a commonly known color image compression process such as JPEG to these blocks.

The above-mentioned process is effective for images created by computer applications such as office documents including computer-aided design (CAD), computer graphics (CG), and presentation materials having continuous identical color, but not effective for natural images such as photographs having gradation.

When processing data including a plurality of objects such as photograph objects and CG objects, it is preferable to perform the above-mentioned data reduction processing for CG objects among the plurality of objects. Specifically, the RIP unit 213 interprets the PDL and then identifies CG objects. According to the result of identification, the resolution changeover unit 218 performs the above-mentioned data reduction processing for the CG objects.

According to the first exemplary embodiment, it is possible to efficiently reduce the amount of data without degrading the image quality, regardless of whether or not each block has a uniform color.

The first exemplary embodiment has specifically been described based on a process of generating low- and high-resolution pixels based on the value of the most frequent color occupancy rate. However, when the most frequent color occupancy rate is less than Th for all blocks, for example, the amount of data may increase by the data of the superimposition flag. A second exemplary embodiment will be described below based on a process of restraining the increase in the amount of data by discarding the superimposition flag in the above-mentioned case.

Figure 3:
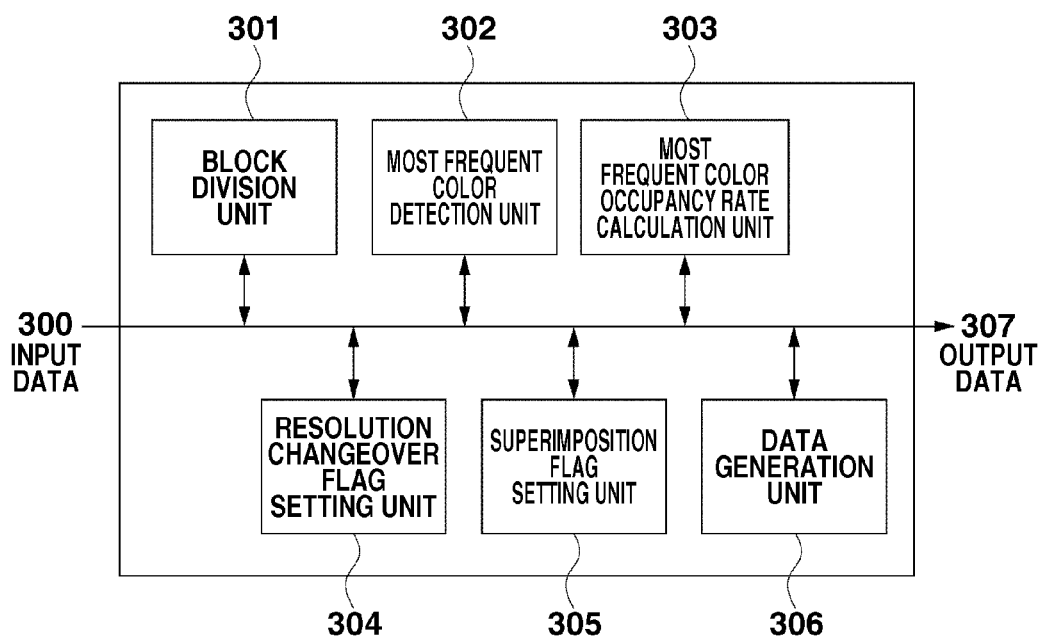
FIG. 3 is a block diagram illustrating an exemplary configuration of a resolution changeover unit in FIG. 2.
Figure 10:
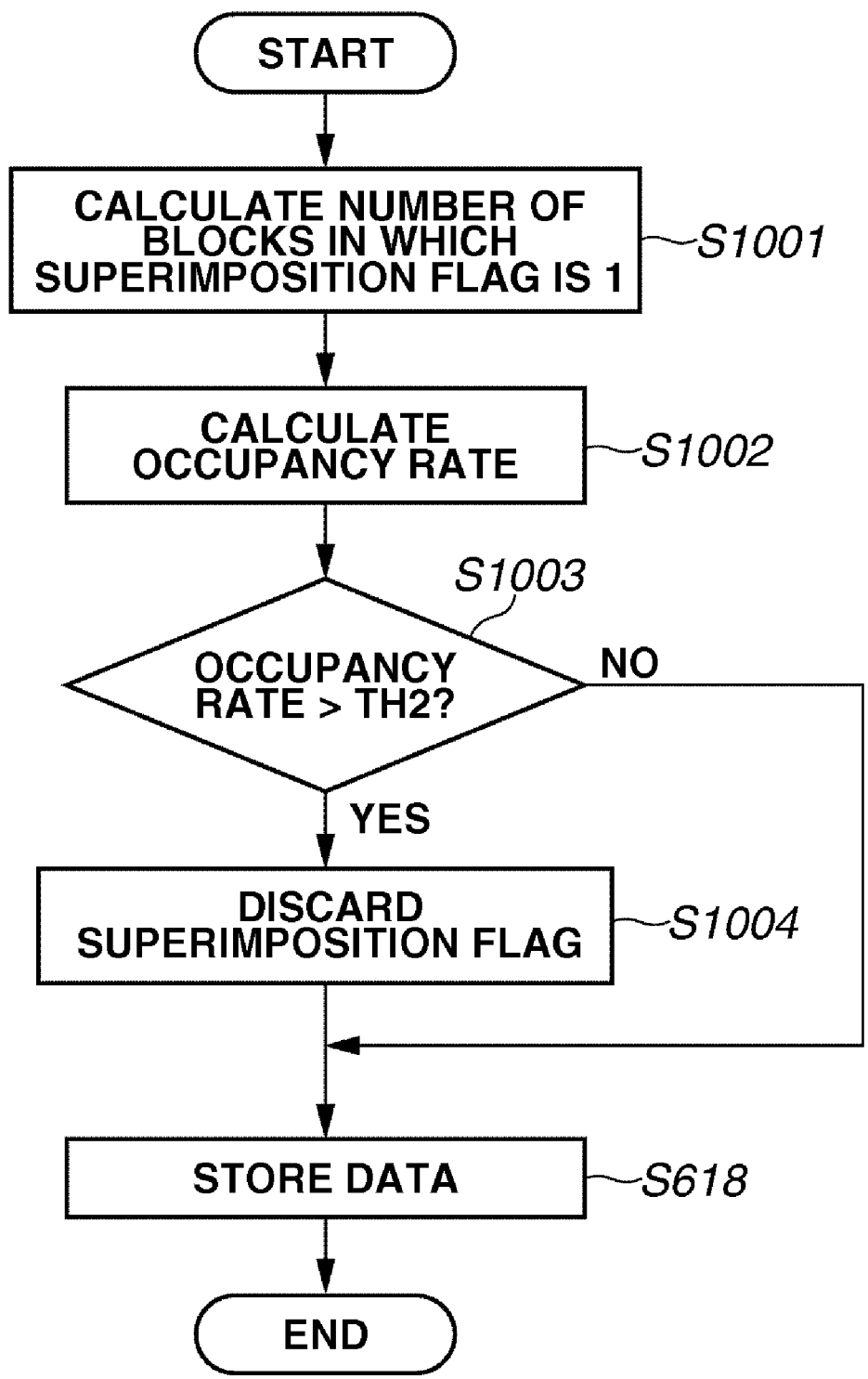
FIG. 10 is a flow chart illustrating processing in the resolution changeover unit in FIG. 2 according to a second exemplary embodiment of the present invention.

The flow chart illustrated in FIG. 10 is assumed to be performed by the resolution changeover unit 218 of FIG. 2 (each processing unit of FIG. 3). Although the CPU 205 reads and executes a computer program stored in the storage unit 211 (computer-readable storage medium) to serve as the resolution changeover unit 218 (each processing unit of FIG. 3) in the present exemplary embodiment, the configuration of the resolution changeover unit 218 is not limited thereto. For example, the resolution changeover unit 218 (each processing unit of FIG. 3) may be configured by hardware such as an electronic circuit.

FIG. 10 is a flow chart of processing performed after completion of steps S601 to S617 of FIG. 6 mentioned above in the first exemplary embodiment. Descriptions of steps S601 to S617 will be omitted.

In step S1001, the CPU 205 calculates the number of blocks in which the superimposition flag is set to 1 in step S609.

In step S1002, the CPU 205 calculates the ratio of the number of blocks calculated in step S1001 to the total number of blocks as an occupancy rate.

In step S1003, the CPU 205 determines whether the occupancy rate calculated in step S1002 is larger than a preset threshold value Th2. When the CPU 205 determines that the occupancy rate is larger than Th2 (YES in step S1003), the processing proceeds to step S1004. In step S1004, the CPU 205 discards the superimposition flag for all blocks. Specifically, the CPU 205 discards blocks represented by superimposing pixels having the most frequent color recognized as a low-resolution pixel and the remaining pixels (pixels except ones having the most frequent color) recognized as high-resolution pixels. Therefore, there remain only blocks composed only of a low-resolution pixel, and blocks composed only of high-resolution pixels.

In step S618, the CPU 205 associates data items stored in the RAM 206 for each block with one another, and stores them in the HDD 211.

Similar to the first exemplary embodiment, when storing data in the HDD 211, it is also possible to collect blocks composed only of a low-resolution pixel and apply a commonly known color image compression process such as JPEG to these blocks.

According to the second exemplary embodiment, for example, when the most frequent color occupancy rate is less than Th for all blocks and the amount of data increases by the data of the superimposition flag, it becomes possible to restrain the increase in the amount of data.

The first and second exemplary embodiments have specifically been described based on a process of dividing the input bitmap image data into a plurality of blocks, and generating data with the amount of data efficiently reduced without degrading the image quality, regardless of whether or not each block has a uniform color. In a third exemplary embodiment, a process of restoring generated data will be described.

Figure 11:
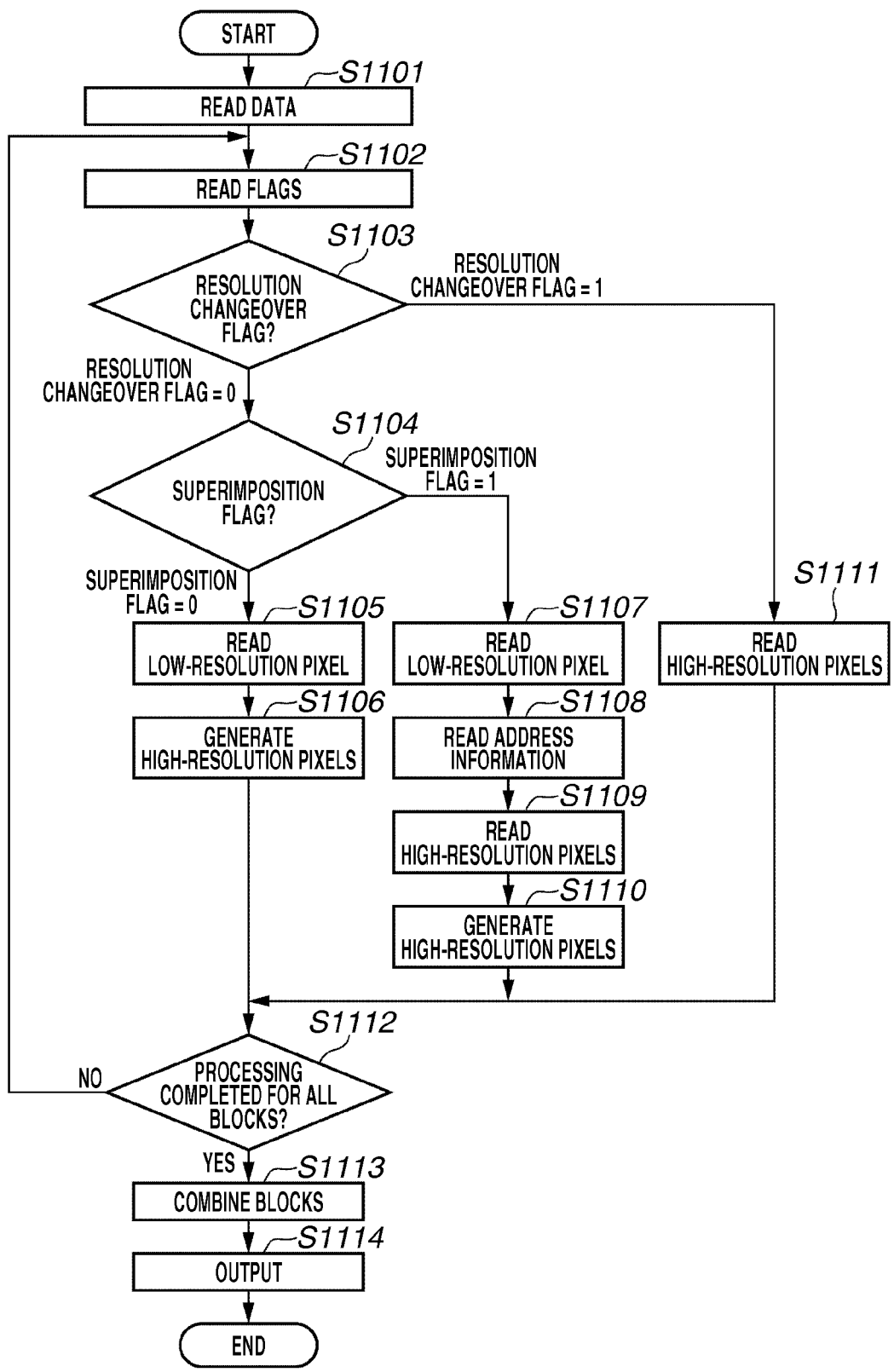
FIG. 11 is a flow chart illustrating processing in the resolution changeover unit in FIG. 2 according to a third exemplary embodiment of the present invention.

The flow chart illustrated in FIG. 11 is assumed to be performed by a data restoration unit (not illustrated) in the resolution changeover unit 218. Although the CPU 205 reads and executes a computer program stored in the storage unit 211 (computer-readable storage medium) to serve as the data restoration unit in the present exemplary embodiment, the configuration of the data restoration unit is not limited thereto. For example, the data restoration unit may be configured by hardware such as an electronic circuit.

FIG. 11 is a flow chart of processing for restoring data stored in the storage unit 211 after completion of processing of the flow chart in FIG. 6.

In step S1101, the CPU 205 reads the data stored in the storage unit 211. The data stored in the storage unit 211 is associated for each block with one another. Processing of subsequent steps S1102 to S1111 is performed for each block. The above description will be supplemented with reference to FIGS. 1A to 1D. Steps S1102 to S1111 perform processing for restoring the block composed of the pixels 101 to 103 of FIG. 1A based on the data items 104 to 108 of FIG. 1B.

In step S1102, the data restoration unit selects a target block from the data read in step S1101 and then reads the relevant resolution changeover flag and superimposition flag.

In step S1103, the data restoration unit determines that the resolution changeover flag read in step S1102 is 0 or 1. When the resolution changeover flag is 1, the processing proceeds to step S1111 to read high-resolution pixels. When the resolution changeover flag is 0, the processing proceeds to step S1104.

In step S1104, the data restoration unit determines that the superimposition flag read in step S1102 is 0 or 1. When the superimposition flag is 0, the CPU 205 performs processing of steps S1105 and S1106. In step S1105, the CPU 205 reads a low-resolution pixel. In step S1106, the CPU 205 generates high-resolution pixels from the low-resolution pixel read in step S1105. The above description will be supplemented with reference to FIG. 12. In step S1106, the CPU 205 generates 4×4 pixels 1202 from a pixel 1201. When the superimposition flag is 1, the CPU 205 performs steps S1107 to S1110. In step S1107, the CPU 205 reads a low-resolution pixel. In step S1108, the CPU 205 reads address information. In step S1109, the CPU 205 reads high-resolution pixels. In step S1110, the CPU 205 generates high-resolution pixels from the low-resolution pixel read in step S1107, and then superimposes the high-resolution pixels by using the address information read in step S1108 and the high-resolution pixel data read in step S1109. The above description will be supplemented with reference to FIG. 12. In step S1110, the CPU 205 generates the 4×4 pixels 1202 from a pixel 1201. For example, when the address information read in step S1108 is "(1,1) (3,3)" and the high-resolution pixel data read in step S1109 is pixels having colors "BC", 4×4 pixels 1203 are generated through superimposition processing based on these pieces of information.

In step S1112, the CPU 205 determines whether processing is completed for all blocks. When the CPU 205 determines that processing is not completed for all blocks (NO in step S1112), the CPU 205 returns to step S1102. When the CPU 205 determines that processing is completed for all blocks (YES in step S1112), the processing proceeds to step S1113.

In step S1113, the data restoration unit combines a plurality of blocks each being composed of M×N pixels (M and N are integers) to generate output data. More specifically, the data restoration unit performs the processing of step S601 of FIG. 6 in reverse order. In step S1114, the printer unit 202 outputs the output data generated in step S1113.

According to the third exemplary embodiment, it becomes possible to restore the data generated in the first and second exemplary embodiments.

A fourth exemplary embodiment will specifically be described below with respect to the restoration process changeover according to the usage of data when restoring the data generated in the first and second exemplary embodiments. When the image quality is given priority, the CPU 205 performs the restoration processing described above in the third exemplary embodiment. When the speed is given priority, the CPU 205 performs the restoration processing to be described below in the fourth exemplary embodiment.

When the speed is given priority, the degradation in image quality remains unnoticeable even after performing irreversible restoration such as preview, thumbnail display, and reduced layout (N-up).

The flow chart illustrated in FIG. 13 is assumed to be performed by the data restoration unit (not illustrated) in the resolution changeover unit 218. Although the CPU 205 reads and executes a computer program stored in the storage unit 211 (computer-readable storage medium) to serve as the data restoration unit in the present exemplary embodiment, the configuration of the data restoration unit is not limited thereto. For example, the data restoration unit may be configured by hardware such as an electronic circuit.

FIG. 13 is a flow chart for performing processing for restoring the data stored in the storage unit 211 after completion of the processing of the flow chart of FIG. 6. As to processing similar to that of the flow chart of FIG. 11, the same step number is used and its description will be partially omitted. In step S1301, the data restoration unit determines whether the image quality or speed is given priority. When the CPU 205 determines that the image quality is given priority (IMAGE QUALITY PRIORITY in step S1301), the processing proceeds to the flow chart of FIG. 11. When the CPU 205 determines that the speed is given priority (SPEED PRIORITY in step S1301), the processing proceeds to step S1101. Descriptions of steps S1101 to S1104 will be partially omitted.

In step S1103, when the resolution changeover flag is 1, the CPU 205 performs processing of steps S1111 and S1302. In step S1111, the CPU 205 reads high-resolution pixels. In step S1302, the CPU 205 generates a low-resolution pixel from the high-resolution pixels read in step S1111. In the process of generating a low-resolution pixel, for example, thinning processing is performed. Returning to the description of step S1103, when the resolution changeover flag is 0, the processing proceeds to step S1104. In step S1104, when the superimposition flag is 0, the CPU 205 performs the processing of step S1105. In step S1105, the CPU 205 reads a low-resolution pixel. Although the CPU 205 generates high-resolution pixels from the low-resolution pixel read in step S1105 in the third exemplary embodiment, the low-resolution pixel is used as it is in the fourth exemplary embodiment.

In step S1104, when the superimposition flag is 1, the CPU 205 performs the processing of step S1107. In step S1107, the CPU 205 reads a low-resolution pixel. While the CPU 205 generates high-resolution pixels from the low-resolution pixel read in step S1107, and then superimposes the high-resolution pixels by using the read address information and high-resolution pixel data in the third exemplary embodiment, the low-resolution pixel is used as it is in the fourth exemplary embodiment.

In step S1112, the CPU 205 determines whether processing is completed for all blocks. Descriptions of subsequent steps S1113 and S1114 will be omitted.

According to the fourth exemplary embodiment, the restoration process can be changed according to the usage of data when restoring the data generated in the first and second exemplary embodiments. When the speed is given priority, a low-resolution pixel is used as it is among the data stored in the storage unit 211, so that data restoration can be performed at high speed.

Each processing in the first to fourth exemplary embodiments can also be implemented by executing software (program) acquired via a network or various storage media, in a processing apparatus (including a CPU or processor) such as a personal computer.

According to the above-mentioned exemplary embodiments, it is possible to efficiently reduce the amount of data without degrading the image quality, regardless of whether or not each block has a uniform color.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-157916 filed Jul. 2, 2009, which is hereby incorporated by reference herein in its entirety.

What is claimed is:

1. An apparatus comprising:
   a division unit configured to divide image data into a plurality of blocks each being composed of a plurality of pixels;
   a detection unit configured to detect a most frequent color for each of the blocks;
   a calculation unit configured to calculate an occupancy rate of the most frequent color for each of the blocks; and
   a generation unit configured to generate data by changing between a block composed of at least a low-resolution pixel and a block composed of low- and high-resolution pixels superimposed with each other, based on the most frequent color occupancy rate.

2. The apparatus according to claim 1, further comprising:
   a first setting unit configured to set a resolution changeover flag to different values according to whether or not there is a pixel recognized as a low-resolution pixel in each of the blocks; and
   a second setting unit configured to set a superimposition flag to different values according to whether or not there is a pixel to be superimposed in each of the blocks.

3. The apparatus according to claim 2, further comprising:
   a first unit configured to calculate the number of blocks in a case where there is a pixel to be superimposed;
   a second unit configured to calculate the ratio of the calculated number of blocks to the total number of blocks as an occupancy rate; and
   a third unit configured to discard the superimposition flag in a case where the occupancy rate is larger than a predetermined threshold value.

4. The apparatus according to claim 1, wherein the detection unit detects a color used most frequently as a most frequent color in each of the blocks.

5. The apparatus according to claim 1, wherein the calculation unit calculates an occupancy rate of the most frequent color as a most frequent color occupancy rate in each of the blocks.

6. The apparatus according to claim 1, wherein, in a case where the most frequent color occupancy rate is 100%, the generation unit generates a block composed only of a low-resolution pixel;
   wherein, in a case where the most frequent color occupancy rate is larger than a predetermined threshold value and less than 100%, the generation unit generates a block composed of low- and high-resolution pixels superimposed with each other; and
   wherein, in a case where the most frequent color occupancy rate is smaller than the predetermined threshold value, the generation unit generates a block composed only of high-resolution pixels.

7. A method comprising:
   dividing image data into a plurality of blocks each being composed of a plurality of pixels;
   detecting a most frequent color for each of the blocks;
   calculating an occupancy rate of the most frequent color for each of the blocks; and
   generating data by changing between a block composed of at least a low-resolution pixel and a block composed of low- and high-resolution pixels superimposed with each other, based on the most frequent color occupancy rate.

8. The method according to claim 7, further comprising:
   setting a resolution changeover flag to different values according to whether or not there is a pixel recognized as a low-resolution pixel in each of the blocks; and
   setting a superimposition flag to different values according to whether or not there is a pixel to be superimposed in each of the blocks.

9. The method according to claim 8, further comprising:
   calculating the number of blocks in a case where there is a pixel to be superimposed;
   calculating the ratio of the calculated number of blocks to the total number of blocks as an occupancy rate; and
   discarding the superimposition flag in a case where the occupancy rate is larger than a predetermined threshold value.

10. The method according to claim 7, further comprising detecting a color used most frequently as a most frequent color in each of the blocks.

11. The method according to claim 7, further comprising calculating an occupancy rate of the most frequent color as a most frequent color occupancy rate in each of the blocks.

12. The method according to claim 7, further comprising:
    generating a block composed only of a low-resolution pixel in a case where the most frequent color occupancy rate is 100%;
    generating a block composed of low- and high-resolution pixels superimposed with each other in a case where the most frequent color occupancy rate is larger than a predetermined threshold value and less than 100%; and
    generating a block composed only of high-resolution pixels in a case where the most frequent color occupancy rate is smaller than the predetermined threshold value.

13. A non-transitory computer readable storage medium storing a computer-executable program of instructions for causing a computer to perform a method comprising:
    dividing image data into a plurality of blocks each being composed of a plurality of pixels;
    detecting a most frequent color for each of the blocks;
    calculating an occupancy rate of the most frequent color for each of the blocks; and
    generating data by changing between a block composed of at least a low-resolution pixel and a block composed of low- and high-resolution pixels superimposed with each other, based on the most frequent color occupancy rate.

14. The non-transitory computer readable storage medium according to claim 13, further comprising:

setting a resolution changeover flag to different values according to whether or not there is a pixel recognized as a low-resolution pixel in each of the blocks; and setting a superimposition flag to different values according to whether or not there is a pixel to be superimposed in each of the blocks.

15. The non-transitory computer readable storage medium according to claim 14, further comprising:

calculating the number of blocks in a case where there is a pixel to be superimposed;

calculating the ratio of the calculated number of blocks to the total number of blocks as an occupancy rate; and discarding the superimposition flag in a case where the occupancy rate is larger than a predetermined threshold value.

16. The non-transitory computer readable storage medium according to claim 13, further comprising detecting a color used most frequently as a most frequent color in each of the blocks.

17. The non-transitory computer readable storage medium according to claim 13, further comprising calculating an occupancy rate of the most frequent color as a most frequent color occupancy rate in each of the blocks.

18. The non-transitory computer readable storage medium according to claim 13, further comprising:

generating a block composed only of a low-resolution pixel in a case where the most frequent color occupancy rate is 100%;

generating a block composed of low- and high-resolution pixels superimposed with each other in a case where the most frequent color occupancy rate is larger than a predetermined threshold value and less than 100%; and generating a block composed only of high-resolution pixels in a case where the most frequent color occupancy rate is smaller than the predetermined threshold value.

\* \* \* \* \*